(12) United States Patent
Loewen

(10) Patent No.: US 11,196,276 B2
(45) Date of Patent: Dec. 7, 2021

(54) MOBILE DEVICE CHARGING AND DOCKING STATION

(71) Applicant: Joanne Loewen, Lutz, FL (US)

(72) Inventor: Joanne Loewen, Lutz, FL (US)

(73) Assignee: BIBICORD, INC., Lutz, FL (US)

( * ) Notice: Subject to any disclaimer, the term of this patent is extended or adjusted under 35 U.S.C. 154(b) by 0 days.

(21) Appl. No.: 16/504,743

(22) Filed: Jul. 8, 2019

(65) Prior Publication Data

US 2019/0379222 A1  Dec. 12, 2019

Related U.S. Application Data

(63) Continuation of application No. 15/299,409, filed on Oct. 20, 2016, now Pat. No. 10,348,109.

(60) Provisional application No. 62/243,905, filed on Oct. 20, 2015.

(51) Int. Cl.
*H02J 7/00* (2006.01)

(52) U.S. Cl.
CPC .............. *H02J 7/0044* (2013.01); *H02J 7/00* (2013.01)

(58) Field of Classification Search
CPC .................................. H02J 7/00; H02J 7/0044
USPC ........................................................ 320/107
See application file for complete search history.

(56) References Cited

U.S. PATENT DOCUMENTS

| | | | |
|---|---|---|---|
| 6,803,525 B1 | 10/2004 | Liao | |
| 8,604,923 B1* | 12/2013 | Rivas Alvarez | ....... A61B 5/022 |
| | | | 340/539.12 |
| 2005/0269987 A1 | 12/2005 | Lin | |
| 2006/0083032 A1 | 4/2006 | McDonald et al. | |
| 2011/0159935 A1 | 6/2011 | Gavara | |
| 2011/0187323 A1* | 8/2011 | Gourley | .................... H02J 5/00 |
| | | | 320/111 |
| 2014/0274204 A1 | 9/2014 | Williams | |
| 2015/0270737 A1* | 9/2015 | Shirakawa | ............ H02J 7/0044 |
| | | | 320/108 |
| 2015/0288205 A1 | 10/2015 | Weinstein et al. | |
| 2015/0295438 A1* | 10/2015 | Herr | ...................... H02J 7/0044 |
| | | | 320/111 |

FOREIGN PATENT DOCUMENTS

| | | |
|---|---|---|
| GB | 2507712 A | 5/2014 |
| JP | 3193395 U | 10/2014 |
| RU | 61947 U1 | 3/2007 |

* cited by examiner

*Primary Examiner* — Robert Grant
(74) *Attorney, Agent, or Firm* — Gary L. Eastman, Esq.; Eastman IP

(57) ABSTRACT

A multi-device charger with an integrated privacy station. The mobile device charger contains a plurality of power options for charging a mobile device. The privacy station of the mobile device charger provides a privacy cover, or shield for concealing a screen of the mobile device from view while the mobile device is charging in the apparatus.

25 Claims, 4 Drawing Sheets

MOBILE DEVICE CHARGING AND DOCKING STATION

RELATED APPLICATION

This application is a continuation of U.S. Utility patent application Ser. No. 15/299,409, filed on Oct. 20, 2016, entitled "Mobile Device Charging and Docking Station," and currently, which claims the benefit of priority to U.S. Provisional Application No. 62/243,905, filed on Oct. 20, 2015, entitled "MULTI-DEVICE CHARGING AND DOCKING STATION"

FIELD OF THE INVENTION

The present invention relates to cell phone chargers, and more particularly to cell phone chargers providing a plurality of charging options.

BACKGROUND OF THE INVENTION

With the proliferation of mobile devices, the need for charging capabilities for the devices has also increased. Because most devices come out of the box with a wired charger, docking cable, and other accessories, the end user is presented with an unsightly tangled mess of wires to accommodate a wide variety of devices, particularly in a family environment, where a number and types of devices may be present within the household.

Similarly, with the proliferation devices, there has been a proliferation of the variety of applications that users consume throughout the day. Messages, such as texts and emails, social network feeds, and the like can present a constant distraction, particularly during meals and other close family gathering or quiet times, such as studying for school and the like. A device carried in a typical charging station continues to present an unobstructed view of the display, which can cause continued distraction or disruption, even when not in use. Similarly, the user is not provided privacy for incoming messages when the device is left to charge.

As can be seen, there is a need for a multi-device charging and privacy station that reduces the clutter associated with these devices and can reduce the distraction presented by the device during quiet times.

SUMMARY OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a mobile device charger with an integrated privacy station. The mobile device charger contains a plurality of power options for charging a mobile device. The privacy station of the mobile device charger provides a privacy cover, or shield for concealing a screen of the mobile device from view while the mobile device is charging in the apparatus.

The mobile device charger comprises a base that extends substantially horizontal so that in some embodiments the base may be amenable to being placed on a counter top while charging a mobile device. The base may also include a power outlet prong that is located at aft end of the base. The power outlet prong is selectively positioned between an extended position, so that that the multi-device power station may alternatively be plugged into and retained in a wall outlet, such that the base is held in a substantially horizontal position. The power outlet prong may also be positioned in a closed position where it may be concealed at the aft end of the base, such as when the station is placed on a surface, such counter top, desk, table, and the like. Alternatively, the prongs may be removably attached to the aft portion of the base. In these embodiments, the base will house an AC/DC power conversion circuit to change the alternating current to a direct current voltage output appropriate for the mobile device.

In other embodiments, the base may be provided with a docking connector, such as a mini, micro-USB port, 30-pin, or lightning connector which may be connected to a computing device, such as a laptop or desktop computer, to permit a docking or tethered data connection with the computing device. Alternatively, the base may be provided with a retractable cord for docking or connection to a remote charging outlet.

A charging connector and cradle assembly are provided on a top surface of the base, at a forward portion thereof, and are adapted to receive a charging end of a mobile device therein. As will be appreciated, the charging connector and cradle assembly should be adapted to engage with and charge a particular device. Accordingly, in some embodiments, the multi-device charger may be produced according to a particular primary device for compatibility of the charging connector and cradle assembly with the primary device. Alternatively, the charging connector alone or with the cradle assembly may be a replaceable module to accommodate a variety of primary devices.

The most common charging connectors currently in use for mobile devices are the micro USB connector, based on standards promulgated by the USB Implementers Forum (USB-IF), and the Lightning connector, which uses a proprietary standard developed by Apple, Inc. Preferred embodiments of the present invention provide support for charging mobile devices with ports for either a micro USB connector or a Lightning connector. In one preferred embodiment, a connector is removably placed into the base, allowing the user to switch between a micro USB connector and a Lightning connector by removing the one from the base and replacing it with the other.

In certain other embodiments, the base may also be provisioned with one or more speakers, and the circuitry in the base may further comprise an audio amplifier. The charging port of the cradle may be further provisioned to receive an audio signal for playback from the device to the integrated speaker. A microphone is also integrated into the base in some embodiments, allowing an audio signal from the microphone to be sent to the device for recording, phone calls, playing games, or other purposes.

A privacy screen is provided at a forward end of the base and extends substantially vertically from the base. A lower portion of the privacy screen may be adapted to form part of the cradle. The privacy screen comprises a substantially flat plate that is aligned substantially parallel with a transverse dimension of the base. The base may preferably have a substantially planar surface that is dimensioned so as to substantially obscure a display of the mobile device while it is retained in the cradle. In preferred embodiments, the privacy screen may be dimensioned so as to completely conceal the mobile device while it is carried in the multi-device charging device.

As seen in reference to FIGS. 2 and 3, in some embodiments the privacy screen mays a substantially flat front surface, which may be adapted to display a logo, or picture selected by the primary user of the charging station. The privacy screen may also be provided with a light so as to provide a back light for the logo or may have a diffuser so as illuminate when a device is carried in the multi-device charger to provide a convenient reference to indicate, such as to a parent, that the user's device has been placed in the charger at an appropriate or designated time. The base may also be provided with a user selectable switch, or a settable timer that blocks the audio output from the device during a designated time period so as to limit audio distractions that may be presented by the device at inappropriate or designated times.

As seen in reference to FIG. 5, the privacy screen may also include a removable/replaceable insert that may be attached to the front end of the base. In other embodiments of the invention, the privacy screen may also be provisioned with a wireless charging device, such as an inductive charger, that may recharge an equipped device when it is carried in the cradle behind the privacy screen.

At an aft portion of the base, the multi-device charging station may also include a pedestal for holding and storing a wearable mobile technology device, such as a watch, or fitness band. The pedestal comprises a vertical post or plate portion attached to the base at a bottom end of the post. At the top end of the post, a wearable device rest portion extends forwardly over an intermediate portion of the base. The rest portion may include a cylindrical or partially-cylindrical surface portion to support the wearable device thereon. Preferably, the rest portion has an integrated charger adapted to charge the particular wearable device. In preferred embodiments of the invention the rest portion may comprise a plurality of user selectable module, wherein each module is adapted with to receive a selected wearable device and has a charging system integrally contained therein that is adapted to charge the particular wearable device. Conductors for powering the charging system may be integrated with, or routed through the pedestal and connect to a power source in the base. The rest module and pedestal top end may be provided with electrical connectors at a connecting interface.

The multi-device charger may further comprise a spare battery charging port and a spare battery. The spare battery charging port may be located on an upper surface of the base at a point that is intermediate between the cradle and the pedestal. The spare battery charging port comprises a connector that is adapted to interconnect with a charging receptacle of a spare battery pack.

BRIEF DESCRIPTION OF THE DRAWINGS

The nature, objects, and advantages of the present invention will become more apparent to those skilled in the art after considering the following detailed description in connection with the accompanying drawings, in which like reference numerals designate like parts throughout, and wherein.

DETAILED DESCRIPTION

Figure 1:
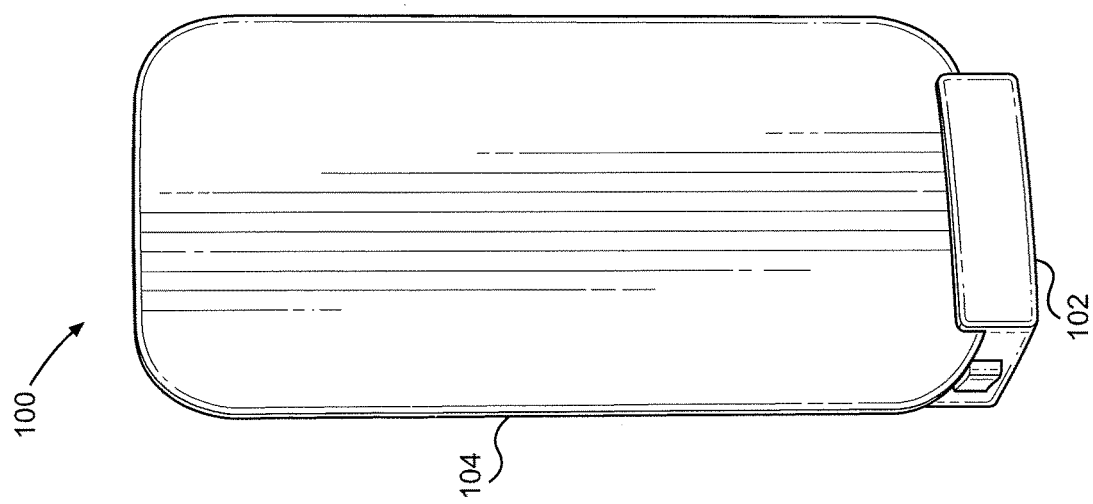
FIG. 1 is a front view of a preferred embodiment of the present invention showing a mobile device charging and docking station with a privacy screen.

Referring initially to FIG. 1, a mobile device charging and docking station is shown and generally designated 100. The charging and docking station 100 has a base 102 upon which a privacy screen 104 projects upward from the base 102. In a preferred embodiment, the privacy screen 104 is removable from the base 102, and may be replaced with privacy screens of different designs. In preferred embodiments, the base 102 includes light-emitting diodes (LEDs, not shown) positioned to emit light upward, illuminating the outside of the privacy screen and creating a nightlight effect.

Figure 2:
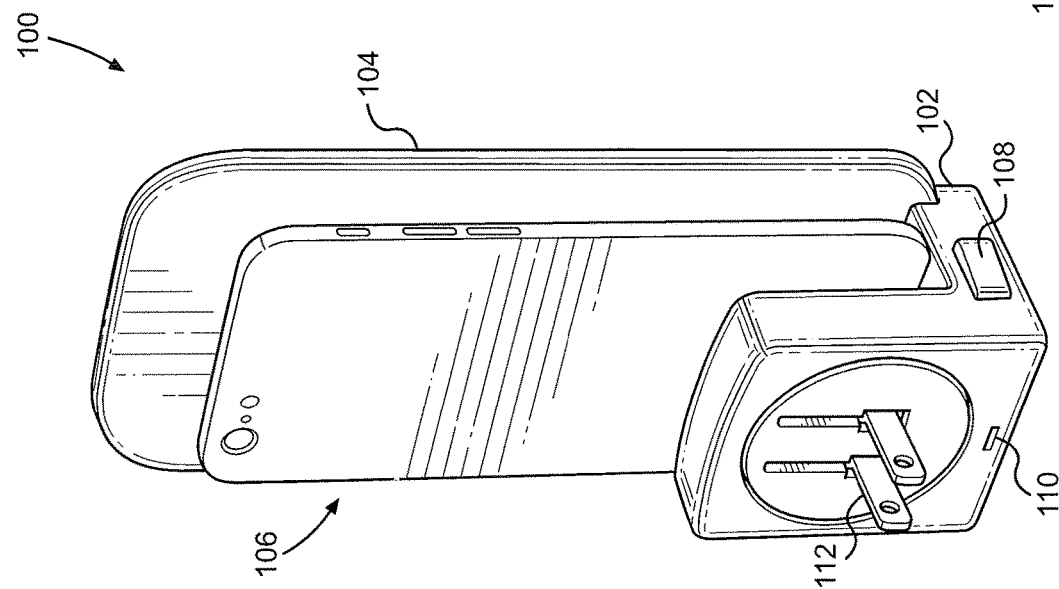
FIG. 2 is a left-rear perspective view of a mobile device charging and docking station showing an attached mobile device, rotating and folding power prongs, and a nightlight switch.

As seen in FIG. 2, when a mobile device 106 is placed on the base 102, the privacy screen 104 obstructs the view of the mobile device 106 from the front, in turn preventing onlookers from viewing the mobile device 106 or its screen. The LEDs may be turned on or off via a switch 108, allowing the user to activate or deactivate the nightlight. An input port 110 is present on the rear of the base 102. In a preferred embodiment the input port 110 is a micro USB port, but in alternative embodiments may be a Lightning port. The input port 110 allows the station 100 to be powered via another device charger. Additionally, rotating and folding power prongs 112 provide an alternative power source for the station 100.

Figure 3:
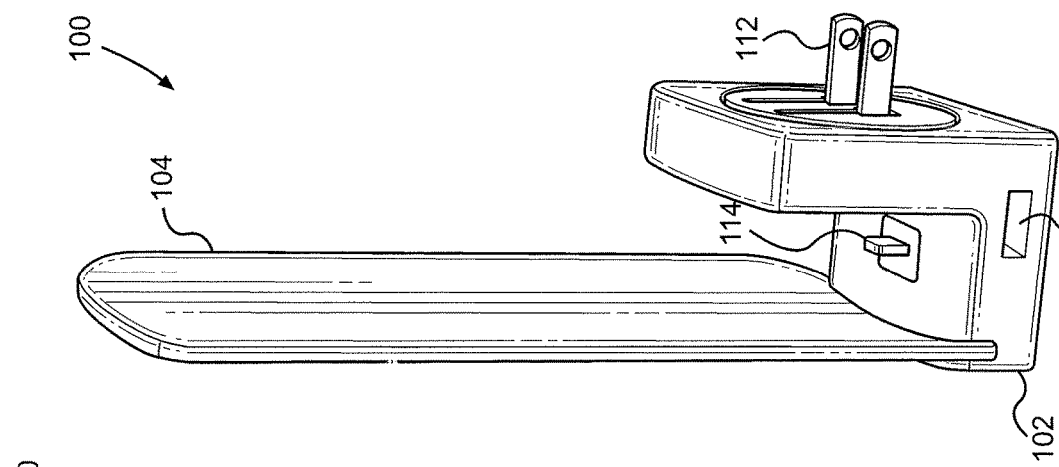
FIG. 3 is a is a right side view of a mobile device charging and docking station showing an interchangeable connector and a USB output port for charging additional devices.

Shown in FIG. 3 is the charging connector 114 through which the user's mobile device 106 is charged. The charging connector 114 may be a micro USB connector or, alternatively, a Lightning connector. In a preferred embodiment, the connector is interchangeable, and the user can replace a lightning connector with a micro USB connector or vice-versa, depending on the type of device to be charged. The privacy screen 104 may also include a wireless inductive charging circuit for use with devices that support wireless charging. A USB output 116 is present on a side of the base 102, allowing for the charging of additional devices.

Figure 4:
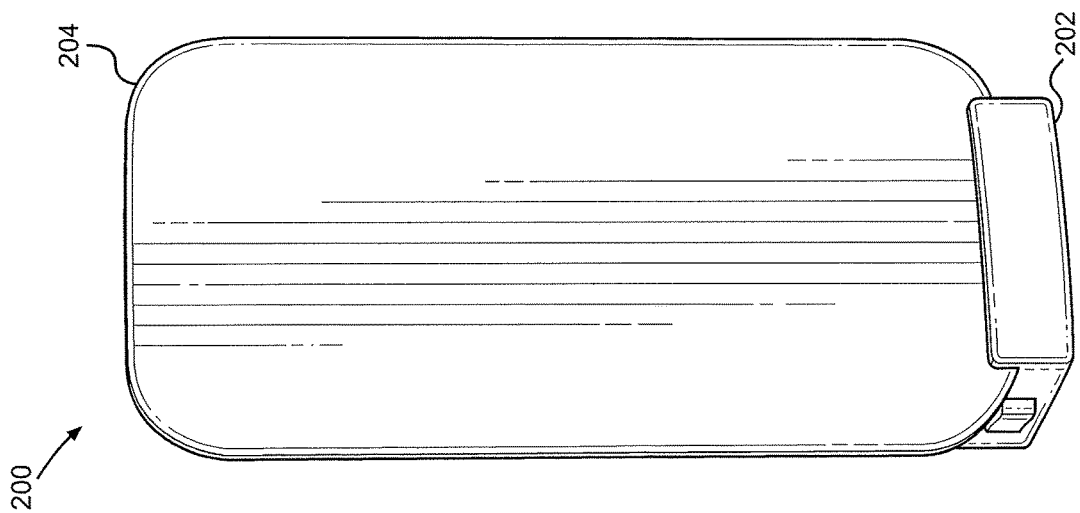
FIG. 4 is a front view of a preferred embodiment of the present invention showing a mobile device charging and docking station with a privacy screen.

Referring now to FIG. 4, a mobile device charging and docking station is depicted and generally referred to as 200. The station 200 has a base 202 and a privacy screen 204 extending upwards from one end of the base. In a preferred embodiment, the privacy screen 204 is removable from the base 202, and may be replaced with privacy screens of different designs. LEDs (not shown) are also present in a preferred embodiment. The LEDs are placed so that emitted light shines upward against the privacy screen 204, and the privacy screen 204 is thereby illuminated.

Figure 5:
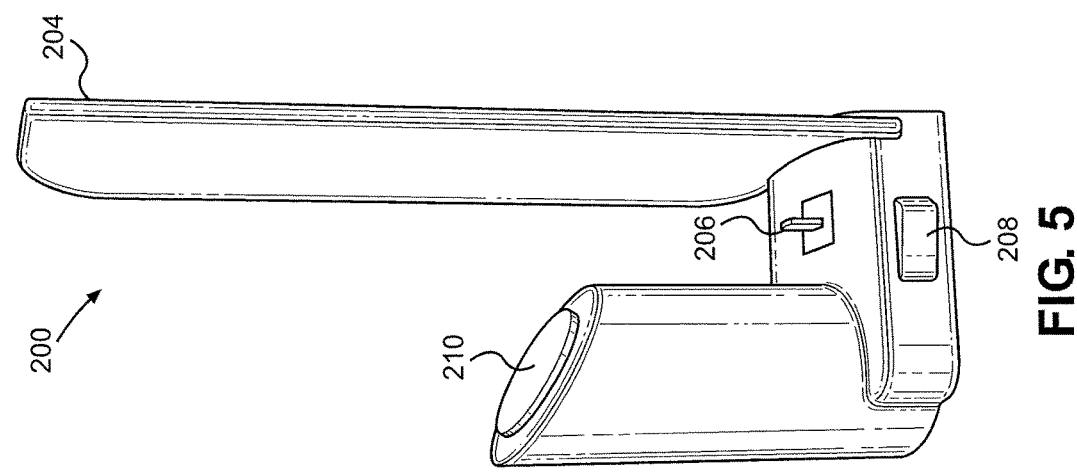
FIG. 5 is a left side view of a mobile device charging and docking station showing a watch station, an interchangeable connector, and a nightlight switch.

In FIG. 5, the station 200 is depicted as having a charging connector 206, a nightlight switch 208, and a watch station 210. In a preferred embodiment, the charging connector 206 is an interchangeable connector allowing for the use of a micro USB connector and a Lightning connector, depending on the type of device to be charged. The privacy screen 204 may also include a wireless inductive charging circuit for use with devices that support wireless charging.

The nightlight switch 208 allows the user to turn the nightlight, which is made up of LEDs shining upward against the privacy screen 204, on and off.

The watch station 210 allows for the placement or storage of a wearable device such as a smartwatch. Integrated into the watch station 210 are charging terminals, a charging port, a wireless inductive charging circuit, or a combination thereof, allowing the user to charge the wearable device placed on the watch station.

Figure 6:
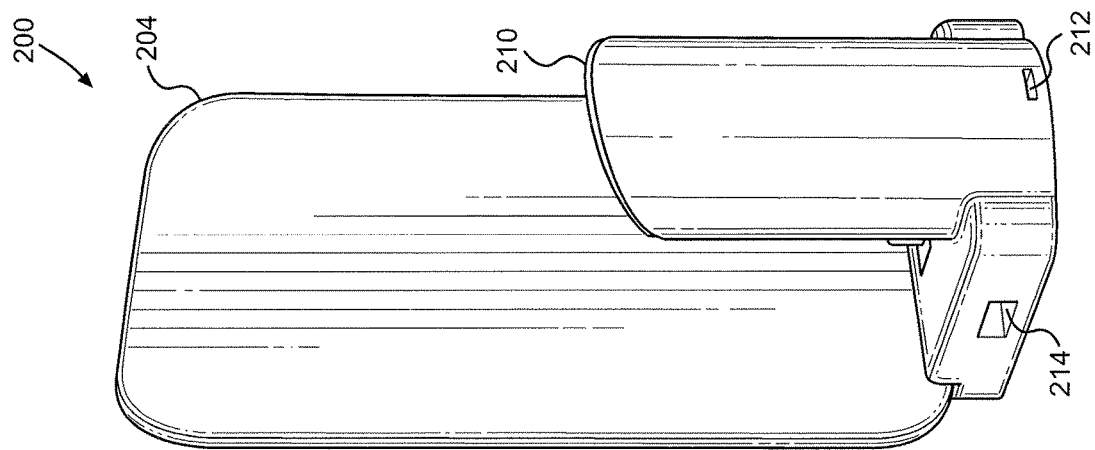
FIG. 6 is a right-rear perspective view of a mobile device charging and docking station showing a USB output port and an input port.

FIG. 6 shows a rear view of mobile device charging and docking station 200, depicting an input port 212 on the base 202 through which the station 200 may be powered. In a preferred embodiment the input port 212 is a micro USB port, but in alternative embodiments may be a Lightning port. If a lightning port is used, it may be configured to work with a 2.4 amp lightning tip or a 4.8 amp lightning tip. The mobile device charging and docking station 200 may also include folding power prongs (not shown) in order to provide power to the station 200 through a standard household power outlet. Also present on one side of the base 202 is a USB output port 214 for charging additional devices.

Figure 7:
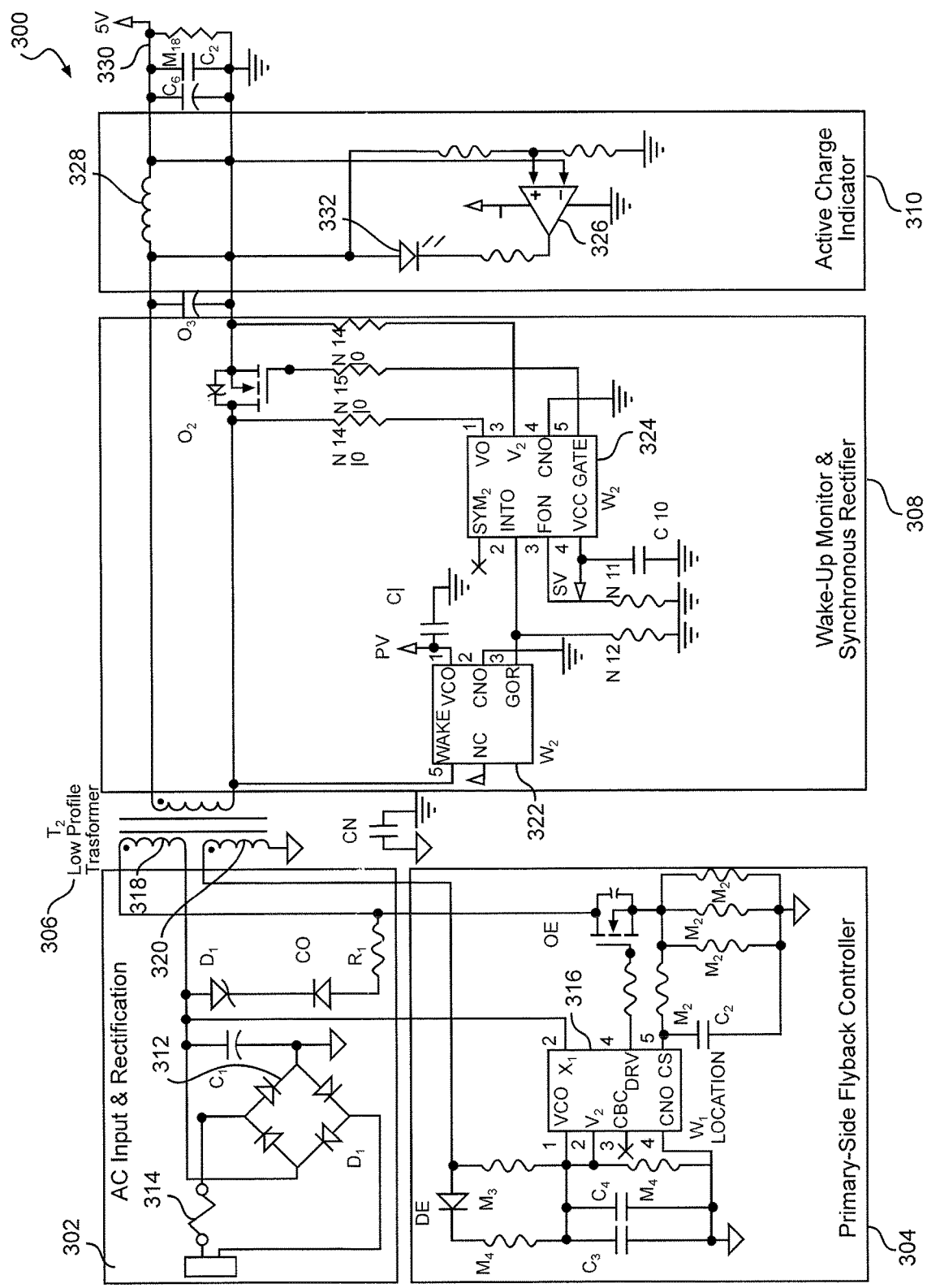
FIG. 7 is a schematic diagram showing an exemplary charging circuit used in an embodiment of the present invention.

FIG. 7 is a schematic of an AC/DC converter circuit 300 as used in charging the internal battery in a preferred embodiment of the invention. The AC input is passed through initial rectifier 302 to a primary side flyback controller 304. Initial rectifier 302 is not present in charging circuits using DC input, and other components of the circuit would be altered or removed as necessary to the specific circumstances. A low-profile transformer 306 then steps down the voltage. A wake-up monitor and synchronous rectifier 308 on the secondary side of the transformer detects the presence or absence of a load, and signals the flyback controller 304 accordingly. The wake-up monitor and synchronous rectifier also acts as a near-ideal diode to rectify the current. An active charge indicator 310 detects when a personal electronic device is being charged and turns on light-emitting diode 332.

In the initial rectifier 302, a neutral AC line feeds one side of a diode bridge 312, while a hot AC line feeds the other side through a protective fuse 314. The rectified current is provided to the flyback controller 304, which is based on a UCC28730 integrated circuit 316. The flyback controller switches the current through primary winding 318 of transformer 306, and monitors the current through auxiliary winding 320 of the transformer. The winding ratios of transformer 306 may differ in different embodiments of the invention intended for sale in different regions of the world, as appropriate to the standard household outlet voltage of the region.

When there is no load, wake-up monitor and synchronous rectifier 308, based on a UCC24650 integrated circuit 322, sends a series of pulses through the transformer signaling the flyback controller 304 to shut down, saving power when there is no device connected to the charger. A UCC24610 integrated circuit 324 provides the synchronous rectifier function, acting as a near-ideal diode providing high efficiency and low voltage or power loss.

Finally, active charge indicator 310 uses a comparator 326 provide a voltage difference across light-emitting diode 332 when a voltage drop across filter inductor 328 indicates an active device is connected. Light-emitting diode 332 thus indicates when a connected personal electronic device is being charged.

After the AC input is transformed and rectified, the internal battery is charged with current provided through 5-volt output 330.

Figure 8:
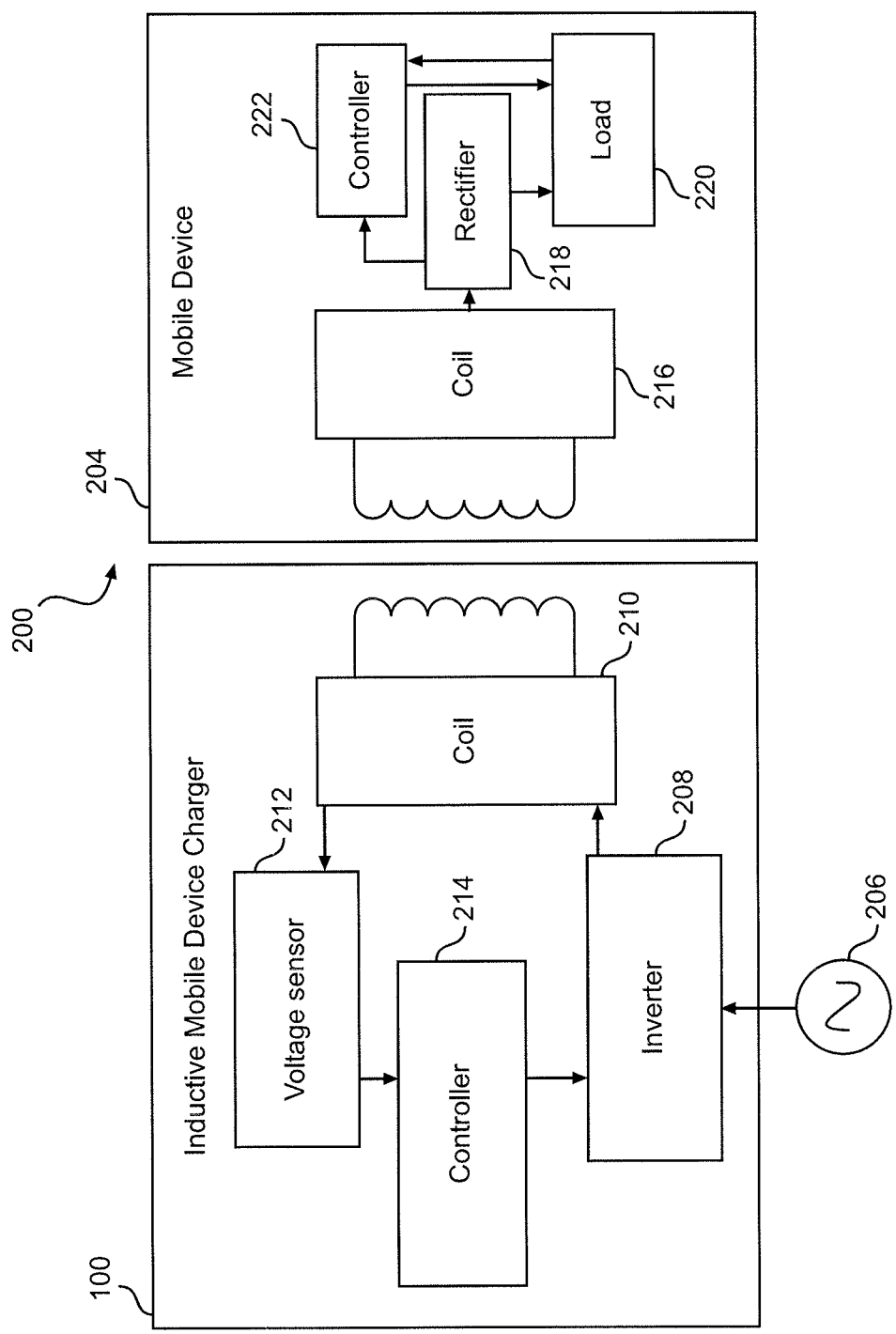
FIG. 8 is a block diagram showing the structure of an inductive charging circuit and its interaction with a mobile device for wireless charging.

FIG. 8 illustrates the primary components and functionality of an inductive charging system 400 used in some embodiments of the present invention for charging a mobile device or a wearable mobile device. The system comprises an inductive mobile device charger 402, which may be present in the privacy screen and/or the watch stand in order to charge the appropriate device, and a mobile device 404. A power source 406, such as an internal battery or rectified current from a power outlet, provides power to an inverter 408. The inverter 408 provides an AC waveform to a primary coil 410. In a preferred embodiment, the frequency of the waveform is between 100 and 200 kHz. In a preferred embodiment, the inverter 408 transfers power to the primary coil 410 by a full-bridge switching arrangement at a 50% duty cycle and a 130 kHz switching frequency. It is to be understood, however, that different frequencies may be used according to the needs of any individual project. A voltage sensor 412 monitors the primary coil 410 and provides data to a controller circuit 414. The controller circuit 414 in turn adjusts the output of the inverter 408 in order to provide an amount of power appropriate to the load provided by the mobile device 404. The voltage sensor 412 and the controller circuit 414 may also detect communications from the mobile device 404 and respond by increasing, decreasing, or shutting off the provided power.

The alternating current through the primary coil 410 creates a magnetic flux, which in turn creates an alternating current in a secondary coil 416 inside the mobile device. The current is rectified by a rectifying circuit 418 and passed on to the load 420. A controller circuit 422 in communication with both the rectifying circuit 418 and the load 420 causes signals to be sent to the inductive mobile device charger 402 requesting the amount of power needed by the load 420. In most instances, the load 420 will comprise a battery, and the power necessary will vary depending on the amount of charge already present in the battery. The controller circuit 422 of the mobile device 404 may communicate with the controller circuit 414 of the inductive mobile device charger 402 through backscatter modulation by brief alterations of the load placed on the secondary coil 416, which in turn are detected by the voltage sensor 412 in the inductive mobile device charger 402. Additionally, in some embodiments, communication across the primary coil 410 and secondary coil 416 may be accomplished through frequency-shift keying.

While the above is a description of various embodiments of the present invention, further modifications may be employed without departing from the spirit and scope of the present invention. Thus the scope of the invention should not be limited according to these factors, but according to the following claims.

What is claimed is:

1. A mobile device charging station, comprising:
    a base having a first end, a second end opposite the first end, and a charging circuit;
    a first power source connector located on the first end of the base and configured to receive power from an external power source and provide the power to the charging circuit;
    a first charging connector for the mobile device located between the first end and the second end; and a privacy screen attached to the base proximate the second end of the base and extending generally upward from the base and dimensioned to conceal a view consisting of a front side of the mobile device,
wherein the first power source connector comprises rotated and folding power prongs and an AC/DC power conversion circuit.

2. The mobile device charging station as recited in claim 1, wherein the privacy screen is removably attached to the base.

3. The mobile device charging station as recited in claim 1, wherein the privacy screen comprises a replaceable insert.

4. The mobile device charging station as recited in claim 1, wherein the first power source connector comprises an input port.

5. The mobile device charging station as recited in claim 4, wherein the input port comprises a micro USB port.

6. The mobile device charging station as recited in claim 4, wherein the input port comprises a Lightning port.

7. The mobile device charging station as recited in claim 1, wherein the first charging connector is removably attached to the base and interchangeable with a second charging connector.

8. The mobile device charging station as recited in claim 7, wherein the first charging connector comprises a micro USB connector and the second charging connector comprises a Lightning connector.

9. The mobile device charging station as recited in claim 7, wherein the first and second charging connectors are further interchangeable with additional charging connectors.

10. The mobile device charging station as recited in claim 1, wherein the privacy screen comprises an inductive charger configured to recharge a device positioned in the mobile charging station.

11. A mobile device charging station, comprising:
a base having a first end, a second end opposite the first end, and a charging circuit;
a first power source connector located on the first end of the base and configured to receive power from an external power source and provide the power to the charging circuit;
a first charging connector for the mobile device located between the first end and the second end;
a privacy screen attached to the base proximate the second end of the base and extending generally upward from the base and dimensioned to conceal a view consisting of a front side of the mobile device; and
a second power source connector configured to receive power from an external power source and provide the power to the charging circuit.

12. The mobile device charging station as recited in claim 11, wherein the first power source connector comprises rotated and folding power prongs and an AC/DC power conversion circuit.

13. The mobile device charging station as recited in claim 12, wherein the second power source connector comprises an input port.

14. The mobile device charging station as recited in claim 13, wherein the input port is an input port selected from the group consisting of a micro USB port and a Lightning port.

15. The mobile device charging station as recited in claim 13, wherein the input port is a micro USB port.

16. The mobile device charging station as recited in claim 13, wherein the input port is a Lightning port.

17. The mobile device charging station as recited in claim 1, further comprising a pedestal comprising a wearable mobile device charger.

18. The mobile device charging station as recited in claim 17, wherein the wearable mobile device charger comprises an inductive charger.

19. The mobile device charging station as recited in claim 17, wherein the wearable mobile device charger comprises charging terminals.

20. The mobile device charging station as recited in claim 11, wherein the first charging connector is removably attached to the base and interchangeable with a second charging connector.

21. The mobile device charging station as recited in claim 20, wherein the first and second charging connectors are further interchangeable with additional charging connectors.

22. The mobile device charging station as recited in claim 11, wherein the privacy screen comprises an inductive charger configured to recharge a device positioned in the mobile charging station.

23. The mobile device charging station as recited in claim 11, further comprising a pedestal comprising a wearable mobile device charger.

24. The mobile device charging station as recited in claim 23, wherein the wearable mobile device charger comprises an inductive charger.

25. The mobile device charging station as recited in claim 23, wherein the wearable mobile device charger comprises charging terminals.

* * * * *